United States Patent [19]
Golowka et al.

[11] Patent Number: 6,052,250
[45] Date of Patent: Apr. 18, 2000

[54] DISK DRIVE WITH SEPARATELY DETERMINED SERVO AND DATA TRACK PITCH

[75] Inventors: Daniel Golowka; Mark Hagen, both of Rochester, Minn.

[73] Assignee: Western Digital Corporation, Irvine, Calif.

[21] Appl. No.: 08/918,025

[22] Filed: Aug. 25, 1997

[51] Int. Cl.[7] .................................................. G11B 5/596
[52] U.S. Cl. ..................................... 360/77.08; 360/78.14
[58] Field of Search ............................. 360/78.14, 77.08, 360/75, 76, 77.07, 78.04

[56] References Cited

U.S. PATENT DOCUMENTS

| | | | |
|---|---|---|---|
| 5,600,506 | 2/1997 | Baum et al. | 360/78.14 |
| 5,602,693 | 2/1997 | Brunnett et al. | 360/77.08 |
| 5,801,897 | 9/1998 | Kanda et al. | 360/78.14 |
| 5,847,894 | 12/1998 | Blank et al. | 360/77.08 X |

*Primary Examiner*—Aristotelis M. Psitos
*Assistant Examiner*—James L Habermehl
*Attorney, Agent, or Firm*—Milad G. Shara

[57] ABSTRACT

In a disk drive having a disk and a sampled track positioning servo system with a plurality of servo tracks spaced apart by a servo track pitch, a method and apparatus for separately determining the pitch of data tracks based on the servo track pitch and address fields located on the servo tracks. By separately optimizing data track pitch and servo track pitch, the design requirements for data density and servo control can be satisfied without the conflict imposed by a fixed relationship of the two track pitch dimensions.

1 Claim, 7 Drawing Sheets

DISK DRIVE WITH SEPARATELY DETERMINED SERVO AND DATA TRACK PITCH

The invention relates to a sampled servo disk drive where servo track pitch and data track pitch are separately optimized for use with a transducer having dual elements.

BACKGROUND OF THE INVENTION

The disk drive industry is driven by competition in the market to provide ever increasing capacity which, because disk form factors are relatively fixed, results in increasing density of the data recorded on the disk. This density increase may be achieved in two dimensions— circumferentially by packing transitions closer together within a track, and radially by packing more, narrower tracks across the disk. The industry presently prefers sampled track positioning systems where a transducer head mounted on an actuator reads positional information (servo) sectors which are interspersed with data sectors around a track on the disk. The industry also is presently transitioning from a single inductive transducer head to a dual element transducer using a magnetoresistive (MR) head for reading and an inductive head for writing. These disk drives present a particular design challenge in that the data sectors and servo sectors within a circumferential track require completely different processing. With narrower, more closely spaced tracks the problem of precisely maintaining the position of the head over a track is greatly exacerbated. The MR head, although an improvement for reading densely packed data, is particularly a problem in processing servo sectors because of non-linearity in reading magnetic bursts used for determining position and, because of the read and write heads being necessarily spaced apart from each other, there is an offset between them relative to a track passing under the heads which varies according to the radial position of the head over the disk.

Conventionally, a disk drive has a track structure as shown in FIG. 3. A plurality of radially concentric tracks 67 is disposed across a disk 12. The tracks 67 are spaced apart by a data track "pitch" 63 usually expressed in tracks per inch or the reciprocal. Positioned at regular intervals around the tracks are servo sectors 66 written by a servo track writer during manufacturing of the disk drive. When viewed radially across the disk, servo sectors 66 form "servo wedges" 64. The data areas between the servo wedges 64 may similarly be termed "data wedges" 62 having data sectors 65.

As shown in FIG. 1, servo sector 66 comprises a Preamble/Servo Sync Word (SSW) field 102 and a track identification field 104 followed by a group of servo bursts 130,132,134,136. A track positioning servo system (not shown) uses the information from track identification field 104 and servo bursts 130,132,134 and 136 to derive a position error signal (PES) which is minimized by a servo controller to place transducer 120 over a data sector 65 (shown in FIG. 3) in track 67 for reading or writing. Transducer 120 is placed approximately on track center using the track identification field 104 as a coarse position indicator during a seek operation. The transducer is then precisely positioned at track center by reading the servo bursts 130,132,134,136 and correcting the position of the actuator accordingly.

Conventionally, the servo controller finds the center of a track when reading equal portions of servo burst pairs, such as bursts 134 and 136, whose adjoining edges 101 coincide with the track center. Such adjoining edges 101 may be termed a "burst pair centerline." Additional bursts 130 and 132 are provided to resolve ambiguity caused by so-called "blind spots" when the head is unable to resolve burst amplitude differences for incremental position changes. In this specification the space between burst pair centerlines 101 on adjacent tracks forms a "servo track pitch" 61 and in the prior art is coincident with the data track pitch 63. This arrangement disadvantageously constrains the designer's choice of servo track pitch, which is driven by the requirements of a servo control channel and by the economics of servowriting during manufacture, to be bounded by data track pitch which may be driven by other factors such as data density, channel bandwidth, drive mechanics, and competitive market factors. Thus a need is felt for a disk design methodology which allows a designer to separately optimize data tracks and servo tracks.

SUMMARY OF THE INVENTION

The invention provides a disk drive having a disk and a sampled track positioning servo system, the disk drive comprising: a read head having a read head width; a plurality of servo track means disposed on the disk for locating a radial position on the disk, wherein each servo track means has a servo track identification field that defines a servo track and that is distinct from an adjacent servo track identification field, and a sequence of servo bursts, wherein each servo burst has a servo burst width, the servo tracks being spaced apart by a servo track pitch distance, and wherein the read head width defines a linear signal resolution range and wherein the servo burst width is within the linear signal resolution range; a plurality of data tracks being spaced apart by a data track pitch distance, the data track pitch being substantially different than the servo track pitch, each data track being located at a data track address; a write head for writing data on the disk; actuator means for positioning the read head and the write head over predetermined areas of the disk; servo controller means for calculating actuator position and for driving the actuator means to a predetermined location to place the write head to define the data track at a radial position on the disk; the servo controller means determining the actuator position for placing the write head at a data track address to define a data track by calculating the product of [(data track pitch/servo track pitch)*(data track address)] wherein the integer portion of the product identifies a servo track identification field and the fractional part of the product identifies a fractional servo track position.

The invention further provides, in a disk drive having a disk and a sampled track positioning servo system, a read head for reading from the disk and a write head for writing to the disk, an actuator for positioning the read head and the write head over predetermined areas of the disk, a servo controller, and wherein the disk further has a plurality of servo tracks for locating a radial position on the disk, wherein each servo track has a servo track identification field that is distinct from an adjacent servo track identification field and a sequence of servo bursts, wherein each servo burst has a servo burst width, and wherein the read head width defines a linear signal resolution range and wherein the servo burst width is within the linear signal resolution range; a method of positioning the read head and the write head over a data track comprising: providing a servo track pitch; providing a data track pitch, the data track pitch being substantially different than the servo track pitch; providing a targeted data track having a targeted data track address; calculating a targeted servo track identification field and a corresponding fractional targeted servo track as the targeted data track address times the ratio of the data track pitch to the servo track pitch; calculating a position error signal as a concatenation of the targeted servo track identification field with the corresponding fractional track position; and providing the position error signal to the servo controller to drive the actuator to position the read head and the write head over the target data track.

BRIEF DESCRIPTION OF THE PREFERRED EMBODIMENTS

Figure 1:
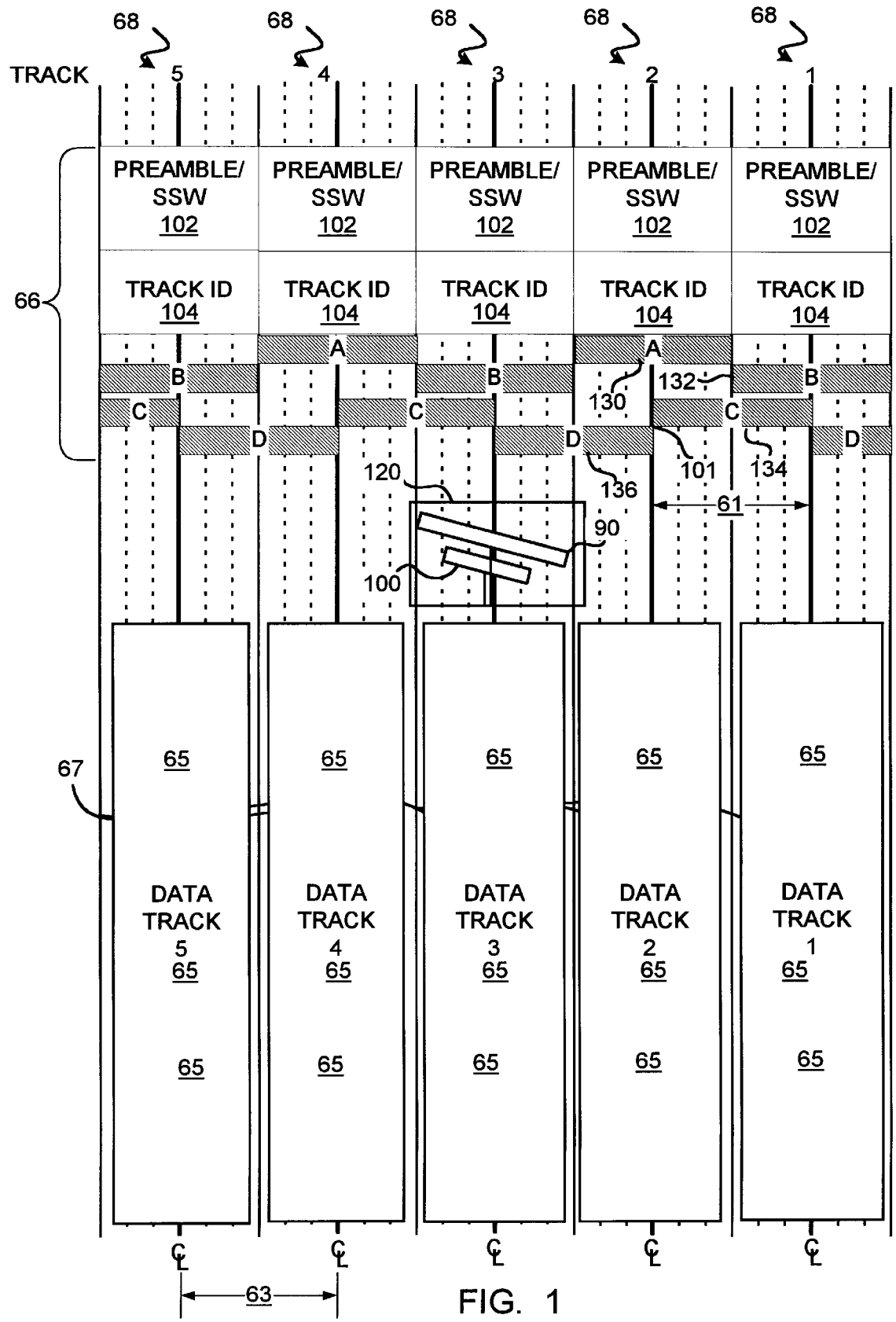
FIG. 1 shows a track diagram of a prior art disk drive showing data and servo tracks 1–5.
Figure 2:
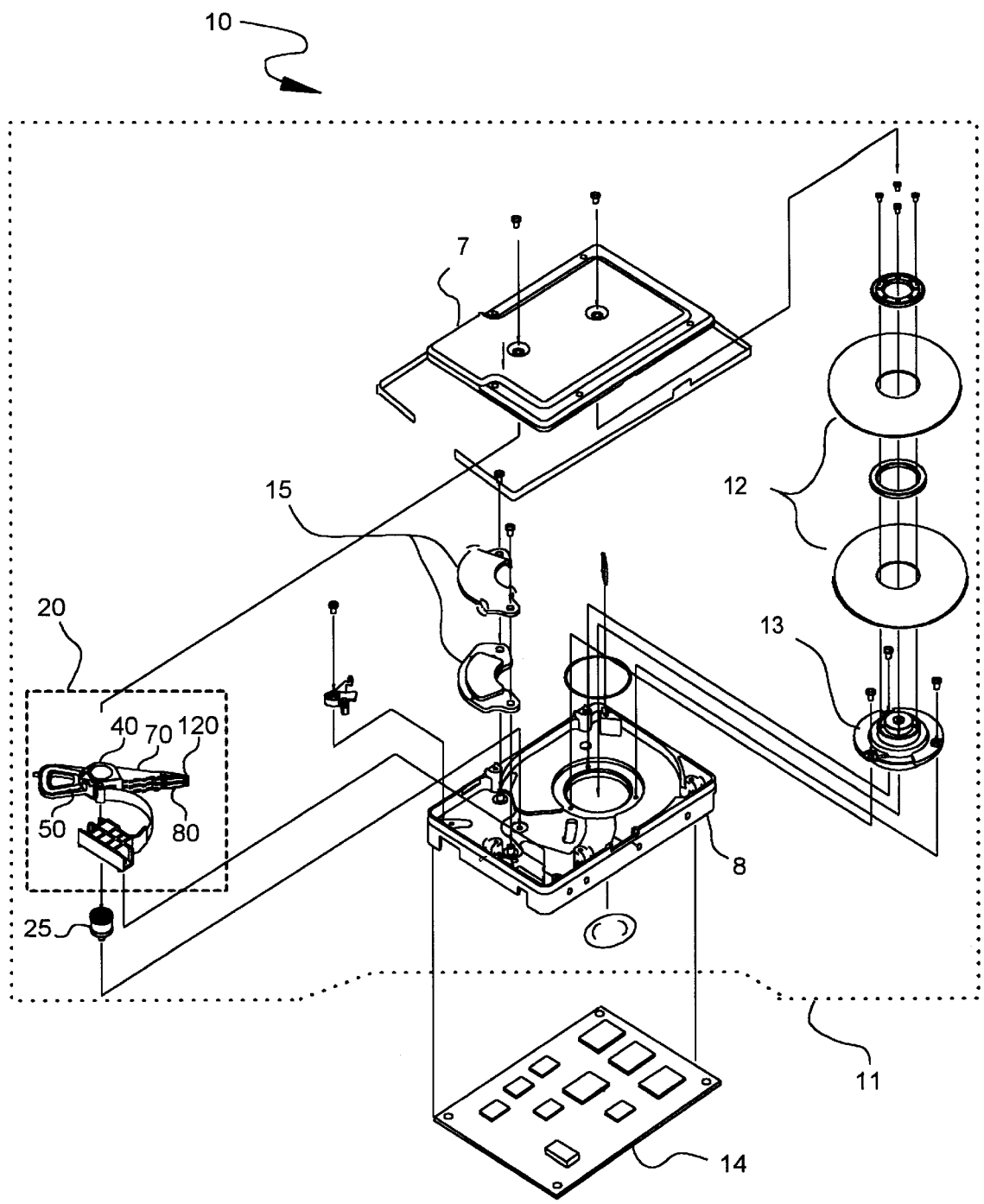
FIG. 2 shows the major subassemblies of a sectored servo disk drive incorporating the present invention.

FIG. 2 shows a sectored servo disk drive 10 comprising a head disk assembly (HDA) 11 and a controller printed circuit board assembly (PCBA) 14. HDA 11 includes a base 8 and a cover 7 forming an enclosure for disks 12 which are rotatably supported by a spindle motor 13. A head stack assembly (HSA) 20 is rotatably supported by a pivot bearing assembly 25 which is fixed to base 8. Head stack assembly 20 comprises a body portion 40 having a bore for inserting pivot bearing assembly 25, a coil portion 50 cantilevered from body portion 40, and a plurality of arms 70 cantilevered from an opposite side of body portion 40 and supporting suspensions 80 attached to each arm. Each of suspensions 80 supports a transducer 120 comprising a read head 100 and a write head 90 (shown in FIG. 1). Coil portion 50 and magnets 15 form a rotary actuator motor which is driven by a servo controller on PCBA 14 to position transducer 120 over a track on disk 12. The read head 100 has a read head width that differs substantially from the write head 90 width. One example of such a head is the MR head. Read head 100 reads servo and user data from disk 12 while write head 90 writes data on the disk.

Figure 3:
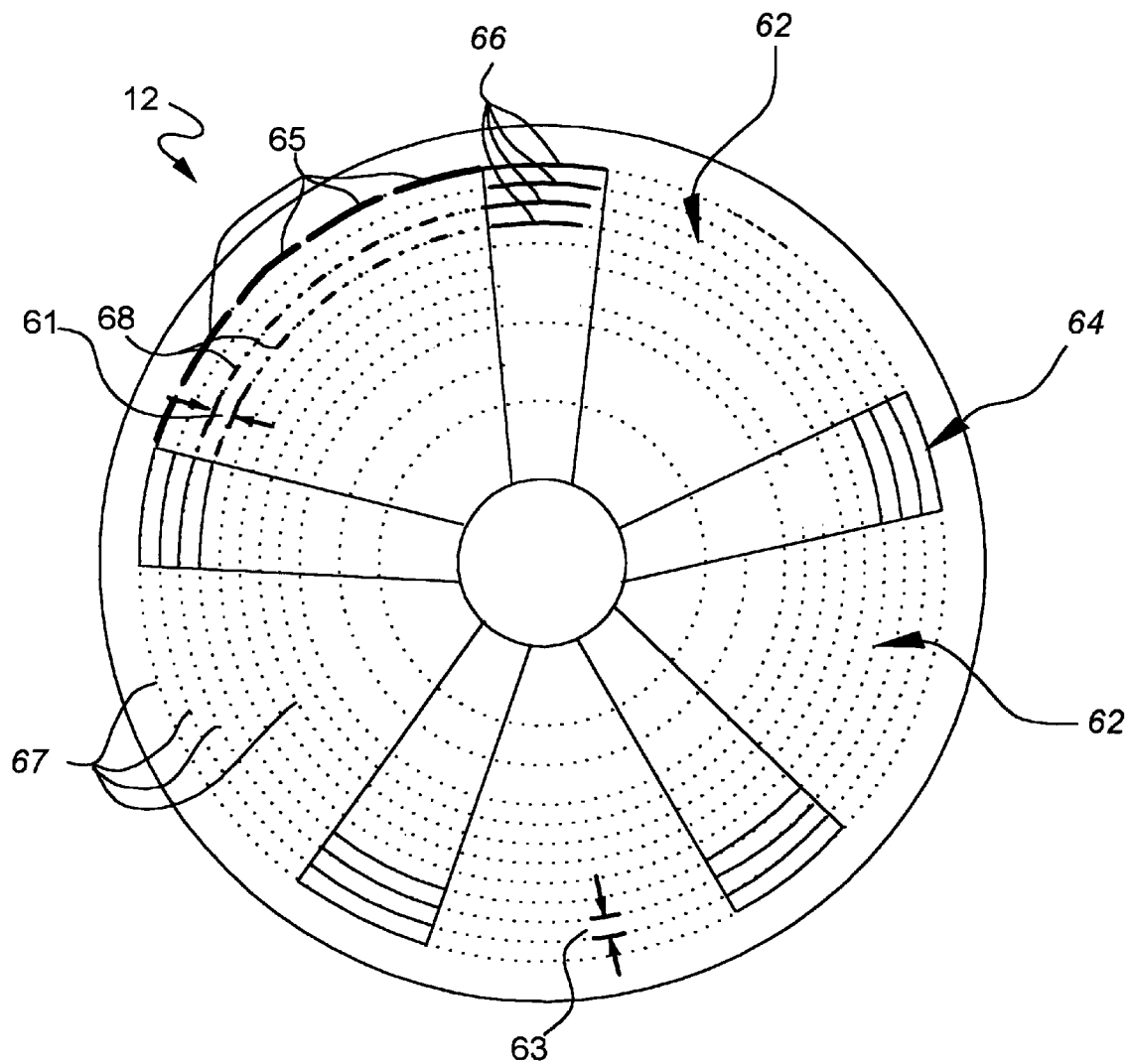
FIG. 3 shows a prior art disk having concentric tracks separated by a data track pitch and comprising data and servo wedges.

Referring now to FIG. 3, showing a prior art track arrangement, a disk 12 comprises a plurality of radially concentric data tracks 67. Data tracks 67 are radially spaced-apart by a distance 63 known as "data track pitch." Servo sectors 66 are disposed at regular angular intervals around the disk 12. For purposes of this specification, "servo track" 68 is formed in effect by drawing a circumferential line through aligned servo sectors around the disk 12. A portion of two adjacent servo tracks 68 is shown by the dash-dot lines in FIG. 3. A plurality of servo tracks 68 are written by a servo track writer (not shown) during the manufacturing of disk drive 10. The radial spacing between servo tracks 68 across the disk is termed "servo track pitch" 61.

The angularly spaced regions of disk 12 containing servo sectors 66 form "servo wedges" 64. Interspersed between servo wedges 64 are data regions or "data wedges" 62. Each data wedge 62 contains one or more data sector 65. Each data sector 65 nominally provides for 512 bytes of user data. In a manner generally practiced, data sector 65 may be of variable size and further may be split between data wedges to accommodate the placement of a servo sector 66. Data sector 65 may be written in "headerless" format, eliminating data sector identification information to gain additional space for user data around a track.

Now turning to FIG. 1, a prior art detailed track diagram shows a plurality of tracks where data track pitch 63 is determined by a fixed relationship with servo track pitch 61. Servo sector 66 for each of tracks 1–5 is shown. Each servo sector 66 comprises a Preamble/Servo Sync Word (SSW) region 102 which allows a servo controller in PCBA 14 to detect a servo sector and establish channel gain and synchronization. Track identification region 104 contains a Gray coded binary sequence used to indicate the track (also known as "cylinder") number. In the prior art, this track identification code is synonymous with the identification of data track 67. Servo bursts 130,132,134, and 136 are used by the servo controller to position transducer 120, comprising read head 100 and write head 90, over a track. Conventionally, a track "centerline" indicated by the CL symbol in FIG. 1 coincides with a burst pair centerline 10, joining the edges of an adjacent pair of bursts. Conventionally the servo controller attempts to position the transducer so that equal portions of an adjacent burst pair pass under the read head.

For track 2 in FIG. 1, the servo controller would attempt to achieve equal amplitudes of bursts 134 and 136 for this case. Bursts 130 and 132 provide additional information to resolve "blind spots" or to aid in positioning the transducer slightly "off-track" to account for skew between read and write heads, known as "micro-jogging."

Data sectors 65, following servo sectors 66 are aligned with track identification fields 104, which forces each data track 67 to be in a fixed relationship with a servo track 68. In the prior art track layout of FIG. 1, the pitch 63 of the data track is the same as the pitch 61 of the servo track; i.e. the ratio of data track pitch to servo track pitch is 1:1. Another view is that the data track pitch is determined by the pitch between adjacent track identification fields. Although a variation in data track pitch could be employed by skipping alternating tracks or every two tracks, yielding an integer ratio between servo tracks and data tracks of 2:1 or 3:1, the granularity of such a tactic is inefficient and does not allow for separately optimizing the pitch of servo and data tracks.

Figure 4:
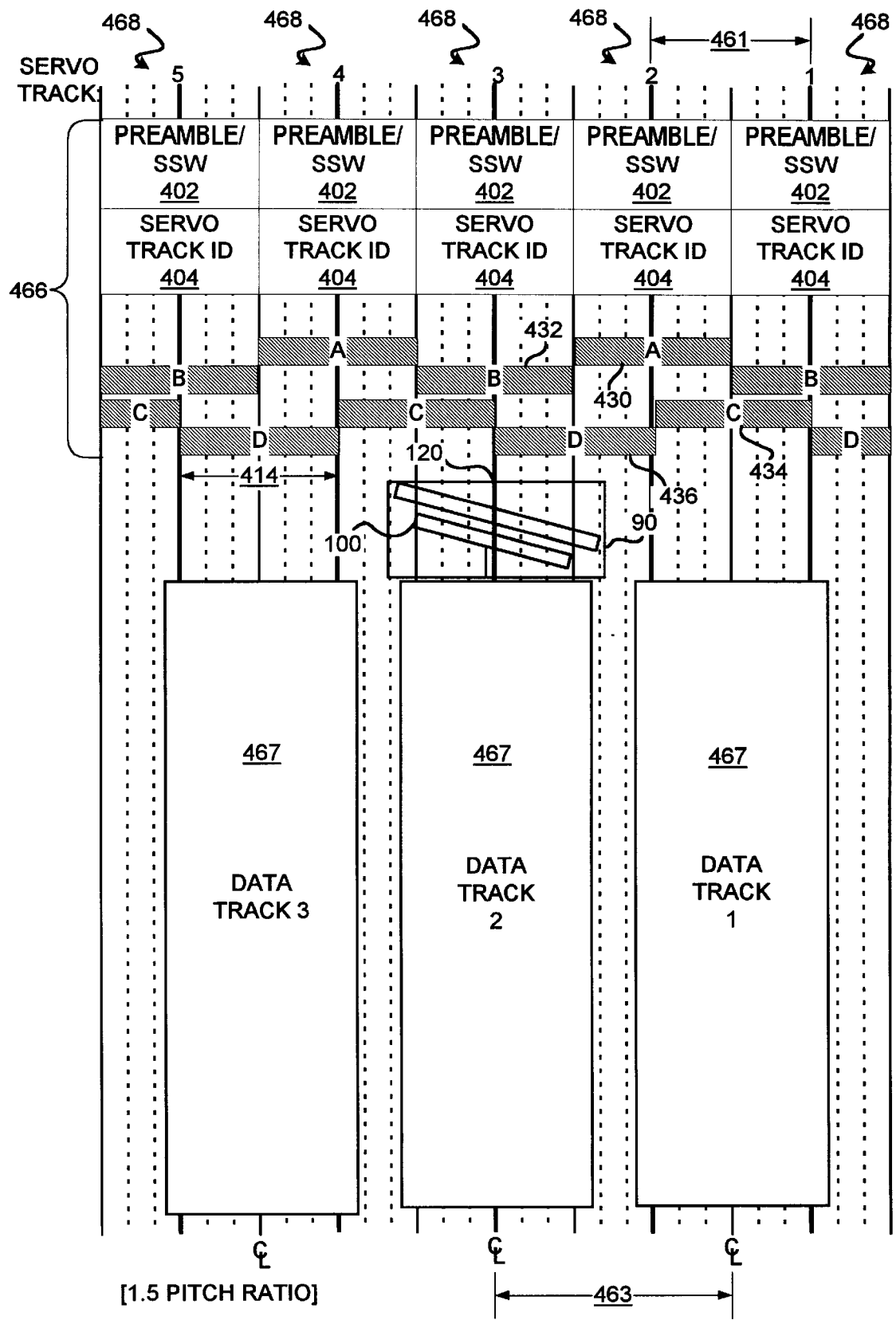
FIG. 4 shows a track diagram of the servo track and data track structure of the invention employing a 1.5:1 ratio between the data track pitch and the servo track pitch.

Refer now to FIG. 4 which shows the servo track and data track structure of the present invention employing a ratio of 1.5:1 between the data track pitch and the servo track pitch. Each servo track 468 labeled 1,2,3,4,5 has a Preamble/SSW field 402 and a servo track identification field 404. Servo track identification field 404 is encoded using a Gray code in a well known manner to ensure that track identification can be read even though a head may be straddling two tracks.

Each servo track 468 further has a sequence of servo bursts 430,432,434, and 436 labeled A, B, C and D. The width of read head 100 largely determines a linear signal resolution range which describes the ability of the servo controller and a read channel, comprising a preamplifier in HSA 20 and signal processing logic in PCBA 14, to associate an increment of radial transducer displacement with a linear increment of electrical signal when reading servo bursts. Servo bursts 430,432, 434, and 436 are written by a servo track writer with a width 414 that is constrained to approximate the linear signal resolution range. A further determinant of linear signal resolution range can be a calibration of read head 90 which may provide means for extending the useful linear signal resolution range by establishing its response at varying burst amplitudes and providing a correction factor.

The servo tracks 468 are spaced apart by a servo track pitch: spacing 461 indicates the servo track spacing between servo track 1 and 2 for example. The invention provides for data tracks 467 to be arbitrarily spaced apart. In FIG. 4, the data track pitch 463 is not synonymous with servo track pitch 461. In the example of FIG. 4, the pitch ratio is 1.5 servo tracks for 1 data track. As will be explained below, the invention provides for the pitch ratio to be arbitrary, limited only by the optimization desired and physical constraints such as write head width.

Figure 5:
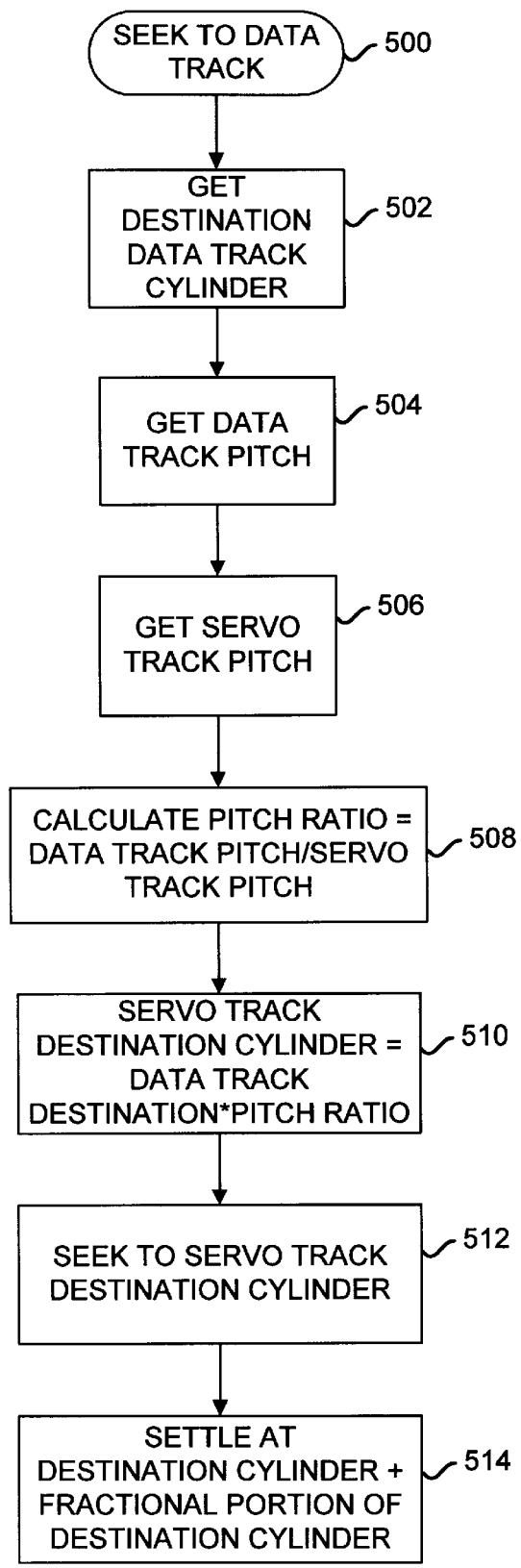
FIG. 5 shows a flow chart of the method of the invention to coarsely position the read head and the write head over a data track.

Refer to FIG. 5 which shows the method of the invention to position the read head and the write head over a data track, known as a seek 500. The method is preferably implemented in firmware executed by a microprocessor or microcontroller which performs at least a portion of the servo controller related functions in the disk drive. At step 502, a targeted data track destination cylinder is obtained. The targeted data track is determined by known methods of mapping logical data blocks to particular cylinder-head-sector combinations in the disk drive and is driven by host requests to read or write data on the disk. In step 504, a data track pitch 463 is obtained from a stored table or register which defines the predetermined distance between data track centerlines. At step 506, a predetermined Servo Track Pitch 461 is obtained in a similar manner. The ratio between Data Track Pitch and Servo Track Pitch (the "Pitch Ratio") is then calculated in step 508. Preferably, the Pitch Ratio may be calculated during the manufacturing of the disk drive and stored so that the calculation is not required to be performed during actual disk operations. In a preferred embodiment, the Pitch Ratio is a constant for the entire disk drive. In an alternate embodiment, the Pitch Ratio may be variable at differing radial locations across one or more surfaces of the disks so that the optimum performance can be obtained from the disk drive.

At step 510 a Servo Track Destination Cylinder is calculated by multiplying the original Data Track destination cylinder by the Pitch Ratio. Since there is no requirement for the Pitch ratio to be an integer, the resulting destination cylinder is expressed as a number having an integer and a fractional portion. At step 512, the actuator is directed to position the transducer 120 over a servo track whose servo track identification field 404 corresponds to the targeted data track 467. The seek process is known in the art and generally consists of causing the actuator to move over a predetermined distance based on the number of tracks to be traversed, the track pitch, and a calibration of actuator current to actuator motion. The track identification fields 404 are read during the seek to verify position of the actuator.

During the conclusion of the seek process at step 514, transducer 120 is positioned approximately over the data track 467 center, by moving the actuator an increment equaling the fractional portion of the destination cylinder address. In other words, a seek to servo track address 1.5 would position transducer 120 at one half (0.5) track away from the center of track 1 towards track 2.

Figure 6:
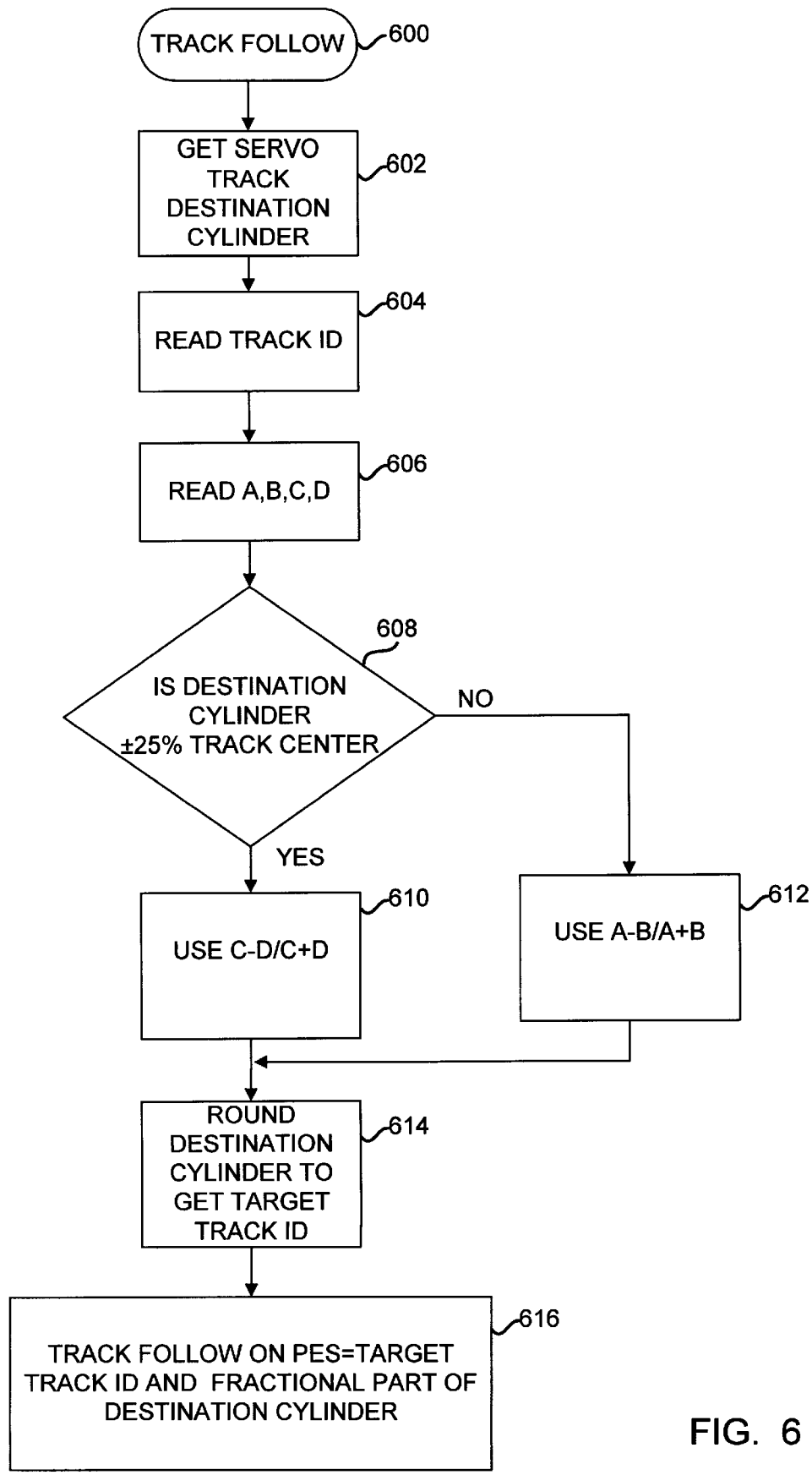
FIG. 6 shows a flow chart of the method of the invention to precisely position the read head and the write head over a data track.

In FIG. 6, the process of precisely positioning the transducer and maintaining the precise position known as track following 600 is illustrated. At 602, the destination servo track cylinder address, expressed as an integer and fractional portion, is established for reference. At each servo sector 466, the track identification field 404 is read at 604. Then each servo burst 430,432,434 and 436 is read at 606. At 608 the destination servo track cylinder address is checked to see if it is within a quarter track (±25%) of the center of the servo track. If the address is within this range, at 610 the C–D bursts 434,436 are selected for use in determining the position error signal (PES) which is a measure of the difference (error) between desired position and that read by the transducer. The alternative case is that the address is within ±25% of the boundary between servo tracks (half track). In this case the A–B burst pair is used to determine the PES at 612. The PES is determined in a well known manner by calculating the gain-adjusted difference in amplitude of the burst pair (e.g. A–B) divided by the gain-adjusted total amplitude of the pair (e.g. A+B). This provides an indication of how much of the head is over one of the bursts versus the other, thereby locating the head position over a track, since there is a known relationship of the burst pair to the track boundaries.

At 614, the servo track identification field 404 is included in the PES calculation by rounding the destination cylinder to the nearest integer track address. Then at 616, the servo controller maintains the transducer at the targeted PES (track following).

Figure 7:
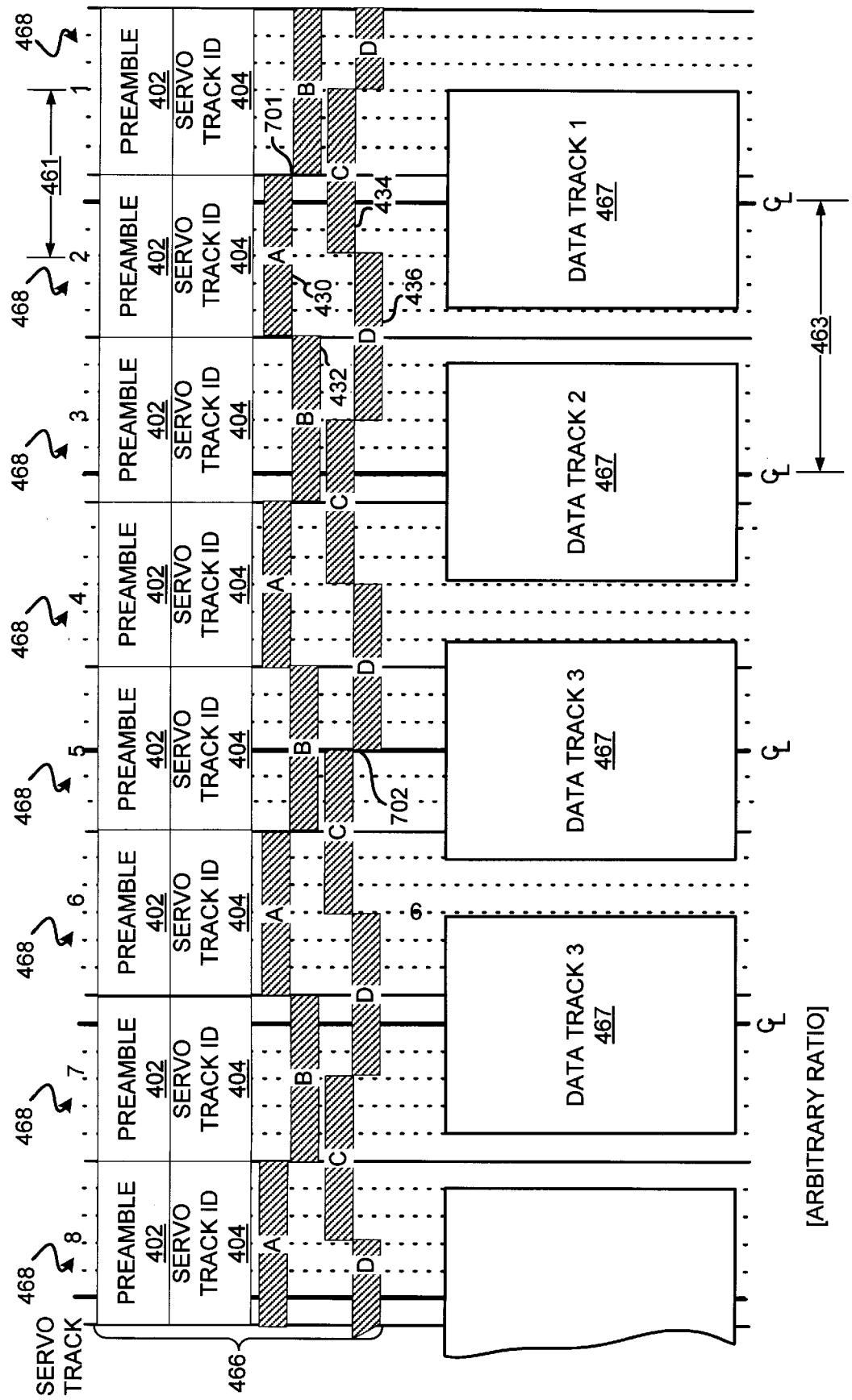
FIG. 7 shows a track diagram of the servo track and data track structure of the invention employing an arbitrary servo track pitch to data track pitch ratio.

The choice of burst pair (A–B or C–D) is more clearly illustrated in FIG. 7 which illustrates an arbitrary pitch ratio of 1.67 servo tracks to each data track. Note that the center of each servo track 468 coincides with the burst pair centerline of each C–D burst pair 434,436. This indicates the desirability of using the C–D burst pair for track following on destination servo track cylinder addresses which are within a quarter track (±25%) of the servo track center. For destination servo track cylinders which are within ±25% of the half-track boundary, it can be seen that the centerline of the A–B burst pair 430,432 is to be used. In the example of FIG. 7, data track 1, which is positioned at servo track cylinder address 1.67 (Data track address 1 times pitch ratio 1.67=servo track 1.67), would be followed using centerline 701 of the corresponding burst pair 430,432 placed at the half-track boundary between servo track 1 and 2 i.e. servo track address 1.5. Data track 3, whose centerline coincides with the centerline of servo track 5, (Data track address 3 times pitch ratio 1.67=servo track address 5.01) would alternatively use burst pair centerline 702 of C–D burst pair 434,436.

We claim:

1. A disk drive having a disk and a sampled track positioning servo system, the disk drive comprising:

a read head having a read head width;

a plurality of servo track means disposed on the disk for locating a radial position on the disk, wherein each servo track means has a servo track identification field that defines a servo track and that is distinct from an adjacent servo track identification field, and a sequence of servo bursts, wherein each servo burst has a servo burst width, the servo tracks being spaced apart by a servo track pitch distance, and wherein the read head width defines a linear signal resolution range and wherein the servo burst width is within the linear signal resolution range;

a plurality of data tracks being spaced apart by a data track pitch distance, the data track pitch being varied at different radial locations on the disk and being substantially different than the servo track pitch, each data track being located at a data track address;

a write head for writing data on the disk;

actuator means for positioning the read head and the write head over predetermined areas of the disk;

servo controller means for calculating actuator position and for driving the actuator means to a predetermined location to place the write head to define the data track at a radial position on the disk;

the servo controller means determining the actuator position for placing the write head at a data track address to define a data track by calculating the product of ((data track pitch/servo track pitch)*data track address)) wherein the integer portion of the product identifies a servo track identification field and the fractional part of the product identifies a fractional servo track position.

* * * * *